(12) United States Patent
Yamaji et al.

(10) Patent No.: US 7,441,802 B2
(45) Date of Patent: Oct. 28, 2008

(54) AIR-BAG DEVICE

(75) Inventors: Naoki Yamaji, Moriguchi (JP);
Hidetaka Azuma, Kyoto (JP)

(73) Assignee: Ashimori Industry Co., Ltd., Osaka (JP)

( * ) Notice: Subject to any disclaimer, the term of this patent is extended or adjusted under 35 U.S.C. 154(b) by 50 days.

(21) Appl. No.: 10/562,432

(22) PCT Filed: Jul. 1, 2004

(86) PCT No.: PCT/JP2004/009704

§ 371 (c)(1),
(2), (4) Date: Dec. 28, 2005

(87) PCT Pub. No.: WO2005/002931

PCT Pub. Date: Jan. 13, 2005

(65) Prior Publication Data

US 2006/0151975 A1    Jul. 13, 2006

(30) Foreign Application Priority Data

Jul. 2, 2003    (JP)    ............... 2003-190310

(51) Int. Cl.
*B60R 21/30* (2006.01)
(52) U.S. Cl. ............... 280/739; 280/742
(58) Field of Classification Search ............... 280/739, 280/742, 743.2
See application file for complete search history.

(56) References Cited

U.S. PATENT DOCUMENTS

| | | | |
|---|---|---|---|
| 5,280,953 A | 1/1994 | Wolanin et al. | |
| 5,669,628 A | 9/1997 | Kaufmann et al. | |
| 6,095,557 A | 8/2000 | Takimoto et al. | |
| 6,648,371 B2 * | 11/2003 | Vendely et al. | 280/739 |
| 6,659,499 B2 * | 12/2003 | Jenkins | 280/739 |
| 6,773,030 B2 * | 8/2004 | Fischer | 280/739 |
| 6,832,778 B2 * | 12/2004 | Pinsenschaum et al. | 280/739 |
| 2002/0158456 A1 | 10/2002 | Fischer | |
| 2004/0012180 A1 * | 1/2004 | Hawthorn et al. | 280/739 |

FOREIGN PATENT DOCUMENTS

DE    19640322 A1    3/1998

(Continued)

*Primary Examiner*—Paul N. Dickson
*Assistant Examiner*—Robert A. Coker
(74) *Attorney, Agent, or Firm*—Sughrue Mion, PLLC

(57) ABSTRACT

In an airbag (2), a length extending from a sewn portion (10) to a right periphery of a presser plate (13) is set such that a length (L1) is shorter than a length (L2) wherein the length (L2) is at an attachment side base cloth (3) side and the length (L1) is at a cloth-like piece (9) side. When the airbag (2) is expanded in emergency situations, the attachment side base cloth (3) is expanded while it moves away outwardly from the cloth-like piece (9), thereby opening a vent hole (8), so that the airbag (2) is eased in abrupt expansion directing toward an occupant. When the airbag (2) becomes a sufficient size to protect the occupant, it bends instantaneously a retaining plate (17) to release the parallel portion (9B) of the cloth-like piece (9) from the presser plate (13), so that the cloth-like piece (9) is brought into intimate contact with the attachment side base cloth (3) to close the vent hole (8), thereby protecting the occupant with reliability.

2 Claims, 8 Drawing Sheets

FOREIGN PATENT DOCUMENTS

| | | |
|---|---|---|
| DE | 29804005 U1 | 7/1998 |
| EP | 0810126 A1 | 12/1997 |
| GB | 2299550 A | 10/1996 |
| JP | 11-105664 A | 4/1999 |
| JP | 2002-079905 A | 3/2002 |
| JP | 2002-144996 A | 5/2002 |
| JP | 2002-193058 A | 7/2002 |
| WO | 95/03953 A | 2/1995 |

* cited by examiner

AIR-BAG DEVICE

FIELD OF THE INVENTION

The invention relates to an airbag device whose airbag is deployable at the time of collision of a vehicle to protect an occupant, more particularly to an airbag device capable of precisely controlling an expansion speed of an airbag in the midway of the expansion.

BACKGROUND OF THE INVENTION

An airbag device fitted to a driver seat and a passenger seat of a vehicle is to protect an occupant by rapidly expanding an airbag by means of a gas pressure let out from an inflator at the time of collision of the vehicle. In the airbag device described above, it is necessary to ease influence of impact given to the occupant when the airbag is expanded, thereby receiving the occupant softly by the airbag. To that end, it is preferable to avoid a situation where the airbag is abruptly expanded to protrude toward the occupant when the inflator operates. Particularly, since the occupant comes into contact with the airbag in a short time in the case where the occupant sits down adjacent to the airbag device, it is preferable to avoid a situation where the airbag is abruptly expanded to protrude toward the occupant.

For a device for controlling the expansion speed of the airbag described above, various technologies for adjusting opening and closing degree of a vent hole of the airbag are developed. For example, JP 11-334521A (patent reference 1) proposes a device for opening and closing the vent hole by an actuator. In this example, there are provided an actuator made of a plate-like piezoelectric element and a vent hole openable and closable by the actuator, respectively, formed on a retainer for supporting an inflator and an airbag, wherein an internal pressure at the beginning of the expansion of the airbag is detected by a pressure sensor, and it is decided that the occupant approaches the airbag when the internal pressure is higher than a pressure at normal time, thereby energizing the actuator to operate it, so that the vent hole is opened through which gas inside the airbag is discharged outward.

Further, JP 11-105664A (patent reference 2) proposes a device for closing a vent hole by a valve for regulating volume of gas to be let out which is formed of the same base cloth as an airbag. In this example, when the valve for regulating volume of gas to be discharged is temporarily stopped by a tacking thread and the like, a state where the vent hole keeps open is maintained, thereby controlling an expansion speed at the beginning of the expansion of the airbag. Thereafter, when the airbag is expanded, and a stretching force of the airbag becomes larger than a tacking force of the tacking thread, the tacking thread is cut so that the vent hole is throttled by the valve for regulating volume of gas to be discharged. As a result, the gas inside the airbag is restrained from being discharged outward so that the airbag is expanded until it becomes a suitable size to protect the occupant.

However, since the device in the patent reference 1 has a structure to close the vent hole by operating the actuator made of the plate-like piezoelectric element and the like, there is a drawback in that a mechanism to close the vent hole is complex and expensive, and also a response speed is slow. Further, since the patent reference 2 has a system to close the vent hole by cutting the tacking thread by the stretching force of the airbag, there is a drawback in that timing for closing the vent hole is varied largely due to the variations of a breaking force of the tacking thread and the stretching force of the airbag, and also the timing for closing the vent hole can not be changed in response to a driving posture of the occupant.

SUMMARY OF THE INVENTION

The invention has been made in view of the technical problems of the prior arts described above and it is a first object of the invention to provide an airbag device having a closing mechanism of a vent hole which is simple and manufactured at low cost and the closing of the vent hole can be effected with reliability.

It is a second object of the invention to provide an airbag device capable of discharging gas from the vent hole with reliability.

It is a third object of the invention to provide an airbag device capable of protecting an occupant with reliability by closing the vent hole in a short time.

It is a fourth object of the invention to provide an airbag device capable of closing the vent hole and switching of the developing height of an airbag with good timing.

(1) An airbag device in the first aspect of the invention comprising an inflator for generating gas and an airbag expandable by the gas, said airbag device is provided with a gas inflow port provided in the airbag through which the gas flows in, a vent hole provided in the airbag for discharging the gas flown in the airbag, a cloth-like piece connected to a vicinity of the vent hole at one end thereof, and to a vicinity of the gas inflow port at the other end thereof releasably, wherein said cloth-like piece does not close the vent hole in a state where the other end is retained, and closes the vent hole due to an internal pressure of the airbag in a state where the other end is released, a retaining device for retaining the other end of the cloth-like piece, and releasing means for releasing retention of the retaining device.

(2) The airbag device described under item (1) as above, wherein a length of the cloth-like piece from one end to the other end is shorter than a length of the airbag from one end to the other end.

(3) The airbag device described under item (1) or (2) as above, wherein the cloth-like piece is connected to an inside of the airbag at one end at the position in the vicinity of the vent hole and remote from the gas inflow port.

(4) An airbag device comprising an inflator for generating gas and an airbag expandable by the gas, said airbag device is provided with a gas inflow port provided in the airbag through which the gas flows in, a vent hole provided in the airbag for discharging the gas flown in the airbag, a cloth-like piece connected to an inside of the airbag at both ends thereof and spaced apart from an edge of the vent hole, an extension cloth connected to the cloth-like piece at one end, to the vicinity of the gas inflow port at the other end to be releasable, wherein said extension cloth does not close the vent hole in a state where the other end is retained, and closes the vent hole due to an internal pressure of the airbag in a state where the other end is released, a retaining device for retaining the other end of the cloth-like piece, and releasing means for releasing retention of the retaining device.

(5) The airbag device described under any one of items (1) to (4), wherein the retaining device has a retaining plate, and the releasing means implements releasing by forcibly deforming the retaining plate.

(6) The airbag device described under item (5) as above, wherein the releasing means implement releasing by forcibly deforming the retaining plate by a pressure generated by an explosive.

(7) The airbag device described under any one of items (1) to (6) as above, wherein the airbag is provided with a tether belt for restraining expansion of the airbag, and one end of the tether belt is retained by the retaining device.

According to the invention as set forth in the above items (1), (2), (3) and (4), the vent hole can be closed by merely releasing retention of the other end of the cloth-like piece, so that a closing mechanism of the vent hole is simple and low in cost and the closing of the vent hole can be carried out with reliability. Further, since gas can be discharged through the vent hole by way of a pocket functioning as a gas reservoir, impact to be applied to the occupant at the time of expansion of the airbag can be eased with reliability.

According to the invention as set forth in the above item (5), since the vent hole can be closed in a short time by releasing retention of the cloth-like piece by forcibly deforming the retaining plate, the occupant can be protected with reliability.

According to the invention as set forth in the above item (6), since the retention of the cloth-like piece is released by forcibly deforming the retaining plate owing to explosion by the explosive, an actuator for releasing retention is simple and the vent hole can be closed in a short time.

According to the invention as set forth in the above item (7), since the tether belt and the cloth-like piece are releasably retained by a common retaining device, a structure of the retaining device is simple, and the closing of the vent hole and the switching of the developing height of the airbag can be carried out with good timing.

BEST MODE FOR CARRYING OUT THE INVENTION

Figure 1:
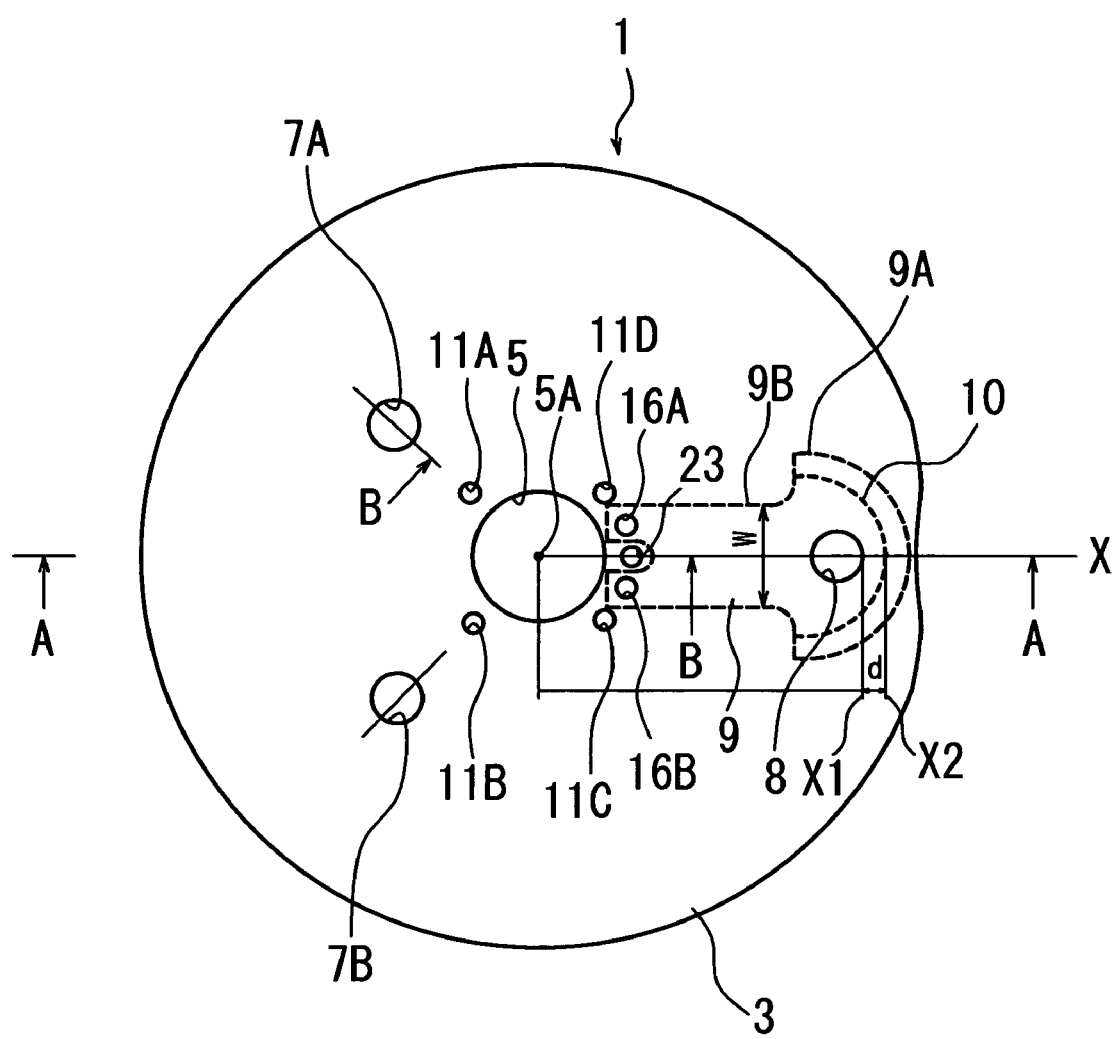
FIG. 1 is a plan view of an airbag device according to a first embodiment of the invention.
Figure 2:
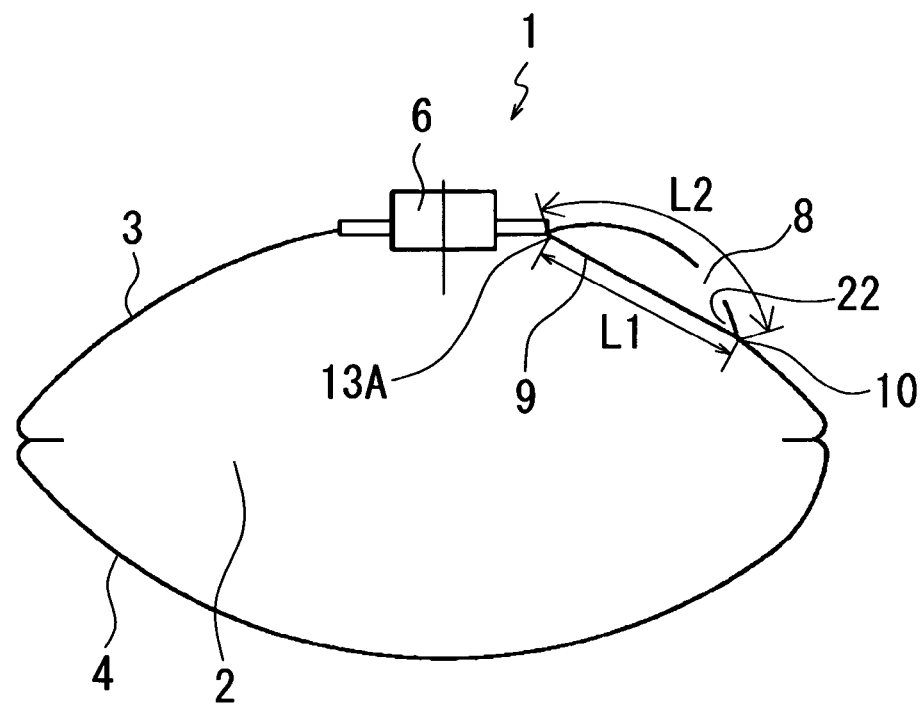
FIG. 2 is a sectional view taken along line A-A in FIG. 1 showing a state where a vent hole is opened.

An airbag device according to the first embodiment of the invention is described hereinafter with reference to the accompanying drawings. FIG. 1 is a plan view showing a state where an airbag device 1 is expanded, which shows a state where an inflator is removed. FIG. 2 is a sectional view taken along line A-A in FIG. 1 showing a state where the inflator is fitted. As shown in FIG. 1 and FIG. 2, the airbag device 1 is formed of the airbag 2 comprised of an attachment side base cloth 3 having a circular shape and an opposed side base cloth 4 having also the circular shape wherein peripheries of the attachment side base cloth 3 and opposed side base cloth 4 are sewn together and reversed to form the airbag 2 having a bag-like shape. The attachment side base cloth 3 is located at a side to be fitted to a vehicle together with the inflator 6 while the opposed side base cloth 4 is located at a side to face the occupant and receives the occupant when the airbag 2 is expanded. The inflator 6 is fitted to a circular gas inflow port 5 formed on the center of the attachment side base cloth 3, and gas generated in the inflator 6 flows in the airbag 2 through the gas inflow port 5, to expand the airbag 2 while developing the airbag 2 in a folded state. There are provided four bolt insertion holes 11A, 11B, 11C and 11D in the attachment side base cloth 3 each spaced at 90 degrees at the peripheral portion of the gas inflow port 5 of the attachment side base cloth 3, and the airbag 2 is fitted to the vehicle using these bolt insertion holes 11A-11D.

Figure 4:
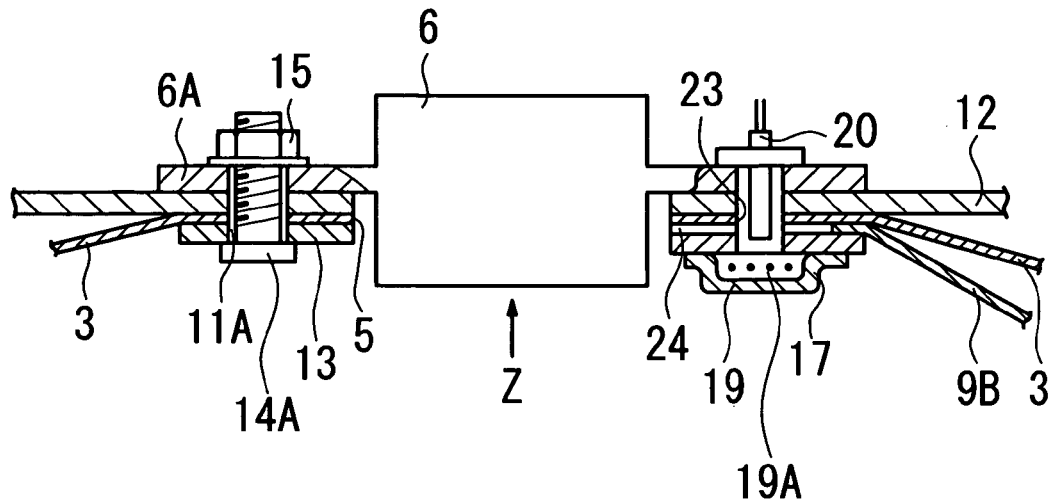
FIG. 4 is an enlarged sectional view taken along line B-B in FIG. 1.
Figure 5:
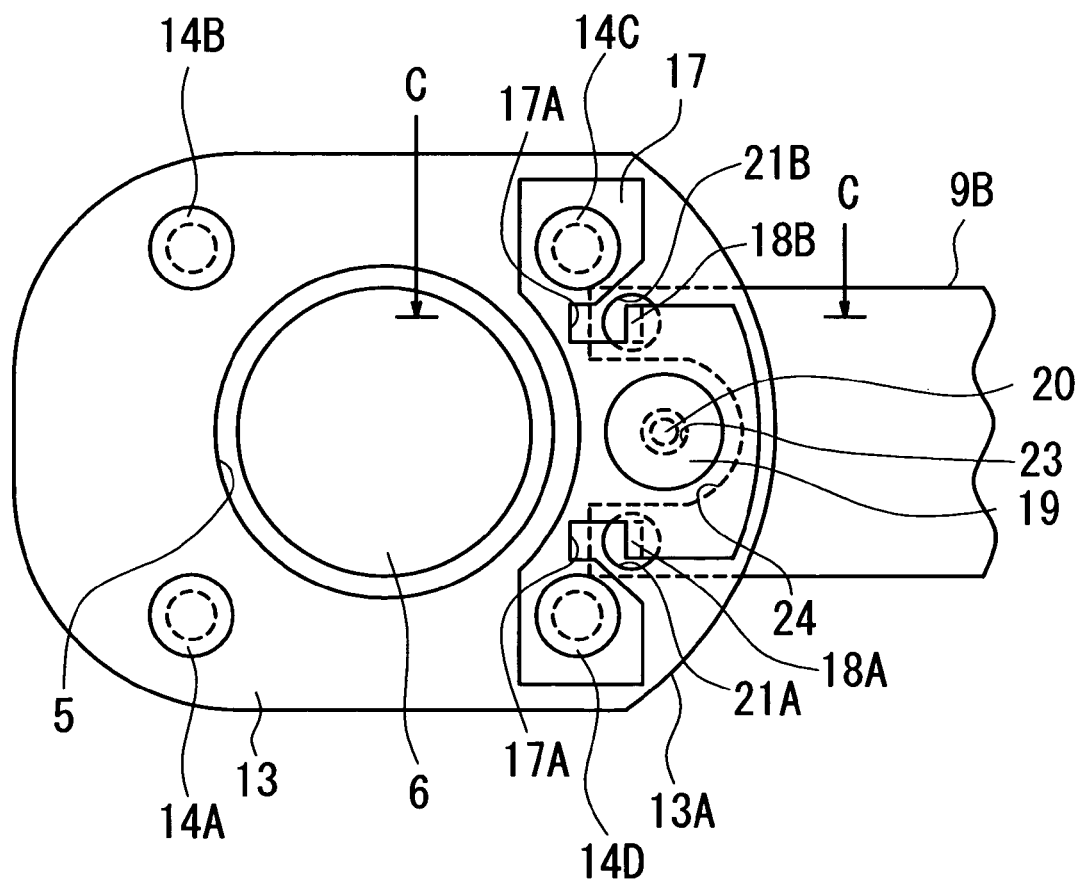
FIG. 5 is a view as viewed from an arrow Z in FIG. 4.

FIG. 4-FIG. 5 show a detailed structure of a metal fitting portion by means of which the airbag 2 is fitted to the vehicle, wherein FIG. 4 is an enlarged sectional view taken along line B-B in FIG. 1 and FIG. 5 is a view as viewed from an arrow Z in FIG. 4. As shown in FIG. 4-FIG. 5, the attachment side base cloth 3 is clamped between a substantially disc-like presser plate 13 and a metal fitting 12, and it is fixed to the metal fitting 12 together with a flange 6A of the inflator 6 by mans of four bolts 14A-14D inserted into four bolt insertion holes 11A-11D and nuts 15 screwed into the bolts 14A-14D respectively. In the manner described above, the folded airbag 2 and the metal fitting 12 to which the inflator 6 is fitted are fixed to a central portion of a steering wheel of the vehicle (not shown).

As shown in FIG. 1, three vent holes 7A, 7B and 8 are provided in the attachment side base cloth 3 for discharging gas flown in the airbag 2 outward. Two vent holes 7A, 7B are formed at positions which are equally spaced from a center 5A of the gas inflow port 5 in a radial direction, while the gas vent hole 8 is formed at a position spaced outwardly from the center 5A of the gas inflow port 5 in a radial direction, wherein a distance from the vent hole 8 to the center 5A is longer than that from the vent holes 7A, 7B to the center 5A. As shown by dotted lines in FIG. 1, a cloth-like piece 9 for closing the vent hole 8 is fitted to the inside of the attachment side base cloth 3. The cloth-like piece 9 has a length extending outwardly from the peripheral portion of the gas inflow port 5 and exceeding the outer end of the vent hole 8, and it is comprised of a parallel portion 9B extending outwardly in the radial direction from the peripheral portion of the gas inflow port 5 and a semicircular portion 9A having a radius curvature which is larger than that of the vent hole 8, and made of a cloth which is the same material as the airbag 2. The cloth-like piece 9 may be made of a cloth which is different from the material of the airbag 2. Further, the cloth-like piece 9 is not limited to a cloth and may be formed of a sheet-like material such as plastics and the like if the material has a flexibility capable of closing the vent hole 8. The cloth-like piece 9 is sewn and fixed to the attachment side base cloth 3 at coordinate axis position X2 which is spaced by a distance d in an outward radial direction from a coordinate axis position X1 extending in the direction of X from the center 5A of the gas inflow port 5 to the edge of the vent hole 8 in the radial direction. A sewn portion 10 of the cloth-like piece 9 has a circular-arc shape and spaced from the edge of the vent hole 8. A width W of the parallel portion 9B of the cloth-like piece 9 is set to be larger than a diameter of the vent hole and has a width which is sufficient to completely close the vent hole 8. It is also possible to control the vent hole 8 so as to discharge gas slightly, by making the width W of the parallel portion 9B of the cloth-like piece 9 smaller than the diameter of the vent hole 8, without the vent hole 8 completely closed.

The parallel portion 9B is detachably fitted to a presser plate 13 at the peripheral portion side of the gas inflow port 5. That is, as shown in FIG. 1, there are provided two retaining holes 16A, 16B in the attachment side base cloth 3 between the bolt insertion holes 11D, 11C along the same circumference of the bolt insertion holes 11D, 11C. An ignitor insertion hole 23 through which an ignitor 20, described later, is inserted, is defined in the attachment side base cloth 3 between two retaining holes 16A, 16B while a U-shaped notch 24 is formed on the parallel portion 9B so as to surround the ignitor insertion hole 23. As shown in FIG. 4-FIG. 5, the parallel portion 9B is inserted in a gap between the presser plate 13 and the attachment side base cloth 3 while the two retaining holes 16A, 16B are positioned so as to align with two holes 21A, 21B defined in the presser plate 13. Then a retaining plate 17 is fixed to the presser plate 13 by way of bolts 14C, 14D, while retaining projections 18A, 18B of the retaining plate 17 are inserted into the retaining holes 16A, 16B through two holes 21A, 21B, thereby restraining the parallel portion 9B from not being come off the presser plate 13.

Figure 6:
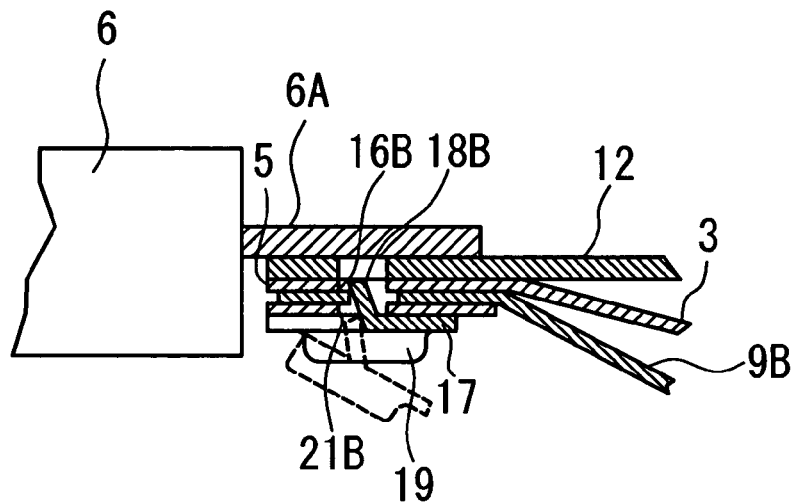
FIG. 6 is a sectional view taken along line C-C in FIG. 5.

An explosive chamber 19 protruding cylindrically toward the inside of the airbag 2 is formed on the retaining plate 17 at the intermediate portion between the retaining projections 18A and 18B, while the explosive 19A is sealed in the explosive chamber 19. The ignitor 20 for igniting the explosive 19A is fitted to the flange 6A of the inflator 6, and the tip end of the ignitor 20 extends to a portion in the vicinity of the explosive 19A. Since necking portions 17A, 17A are provided on the retaining plate 17, when the explosive 19A in the explosive chamber 19 is exploded, the retaining plate 17 is bent along the necking portions 17A due to gas pressure caused by explosion, as shown by two dotted chain lines in FIG. 6, to be subjected to plastic deformation, so that the retaining projections 18A, 18B come off the retaining holes 16A, 16B of the parallel portion 9B, enabling the parallel portion 9B to come off the presser plate 13. Accordingly, when the explosive 19A is exploded in a state where the airbag 2 is expanded, the cloth-like piece 9 is pulled toward the outer peripheral side of the airbag 2 due to a tensile force acting on the attachment side base cloth 3 and the parallel portion 9B comes off the presser plate 13. Igniting timing of the ignitor 20 is determined by detecting whether the occupant sits down on the seat in the vicinity of the airbag device or not. There are concrete examples, as a detection method, such as a method of detecting the occupant by means of a CCD camera, and an infrared sensor, a method of detecting a magnitude or a distribution of a load of the occupant applied to the seat by a load sensor, and the like.

As shown in FIG. 2, as for a length from the sewn portion 10 to the right periphery 13A of the presser plate 13 is set such that L1 is shorter than L2 where L2 indicates a length at the attachment side base cloth 3 side while L1 indicates a length at the cloth-like piece 9 side. Accordingly, when the airbag 2 is expanded due to a pressure of gas flown in, the cloth-like piece 9 having the short length is stretched linearly while the attachment side base cloth 3 side having the long length is expanded substantially in circular-arc to move away from the cloth-like piece 9 outward, so that the vent hole 8 keeps open. Particularly an arc-like pocket 22 defined between the sewn portion 10 and the vent hole 8 functions as a gas reservoir for interrupting a flow of gas directing from the gas inflow port 5 toward the opposed side base cloth 4 to function to guide the interrupted gas into the vent hole 8, thereby discharging the gas efficiently outward from the vent hole 8 so that the airbag 2 is expanded while a speed of the gas directing toward the occupant is reduced. By changing the length L2 at the attachment side base cloth 3 side, the length L1 at the cloth-like piece 9 side, a distance d from the outer end of the vent hole 8 to the sewn portion 10, and a width W of the parallel portion 9B appropriately, discharge amount of the gas from the vent hole 8 can be changed and an expanding speed can be suitably adjusted depending on the size of the airbag 2 and the like.

Now operation of the airbag device according to the first embodiment of the invention is described as follows. That is, in the case where the vehicle comes into collision while traveling, when an acceleration sensor detects that an acceleration of collision exceeds a set value, gas is discharged from the inflator 6 and the gas flows in the airbag 2 through the gas inflow port 5, thereby developing the folded airbag 2 to expand. When the airbag 2 is expanded as shown in FIG. 2, the cloth-like piece 9 stretches linearly due to the tensile force of the airbag 2, while the attachment side base cloth 3 at the vent hole 8 side moves away from the cloth-like piece 9 outwardly to expand in generally circular-arc, thereby keeping the vent hole 8 in an open state. At this point in time, since the arc-like pocket 22 formed between the sewn portion 10 and the vent hole 8 functions as a gas reservoir for interrupting the flow of the gas directing toward the opposed side base cloth 4 side so as to guide the interrupted gas into the vent hole 8, the gas flown in the airbag 2 is efficiently discharged outward through the vent hole 8, the airbag 2 is expanded while an impactive expansion directing toward the occupant side is eased.

Figure 3:
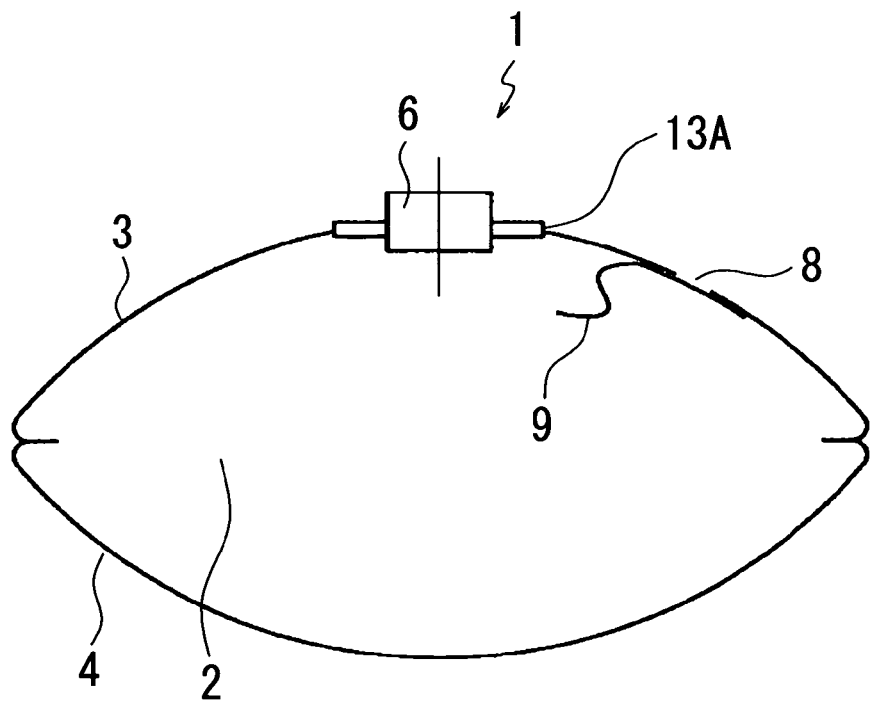
FIG. 3 is a sectional view taken along line A-A in FIG. 1 showing a state where the vent hole is closed.

At the time when the airbag 2 is sufficiently developed up and down and left and right relative to the occupant to become a sufficient size to protect the occupant, the ignitor 20 is ignited to ignite the explosive 19A in the explosive chamber 19 so that the necking portions 17A, 17A of the retaining plate 17 are instantaneously bent due to a gas pressure caused by the explosion of the explosive 19A. The retaining plate 17 is bent up to the position as shown by two dotted chain lines in FIG. 6, so that the retaining projections 18A, 18B come off the retaining holes 16A, 16B of the cloth-like piece 9. Since a tensile force is applied to the cloth-like piece 9 by an expansion force of the attachment side base cloth 3 caused by gas pressure, the parallel portion 9B comes off the presser plate 13 so that the semi-circular portion 9A is brought into intimate contact with the attachment side base cloth 3 due to a gas pressure as shown in FIG. 3, thereby closing the vent hole 8 by the semicircular portion 9A to stop the discharge of the gas through the vent hole 8. At this stage, the opposed side base cloth 4 of the airbag 2 contacts the occupant so that the opposed side base cloth 4 is slightly expanded by the flowing gas, thereby receiving the occupant softly.

Figure 7:
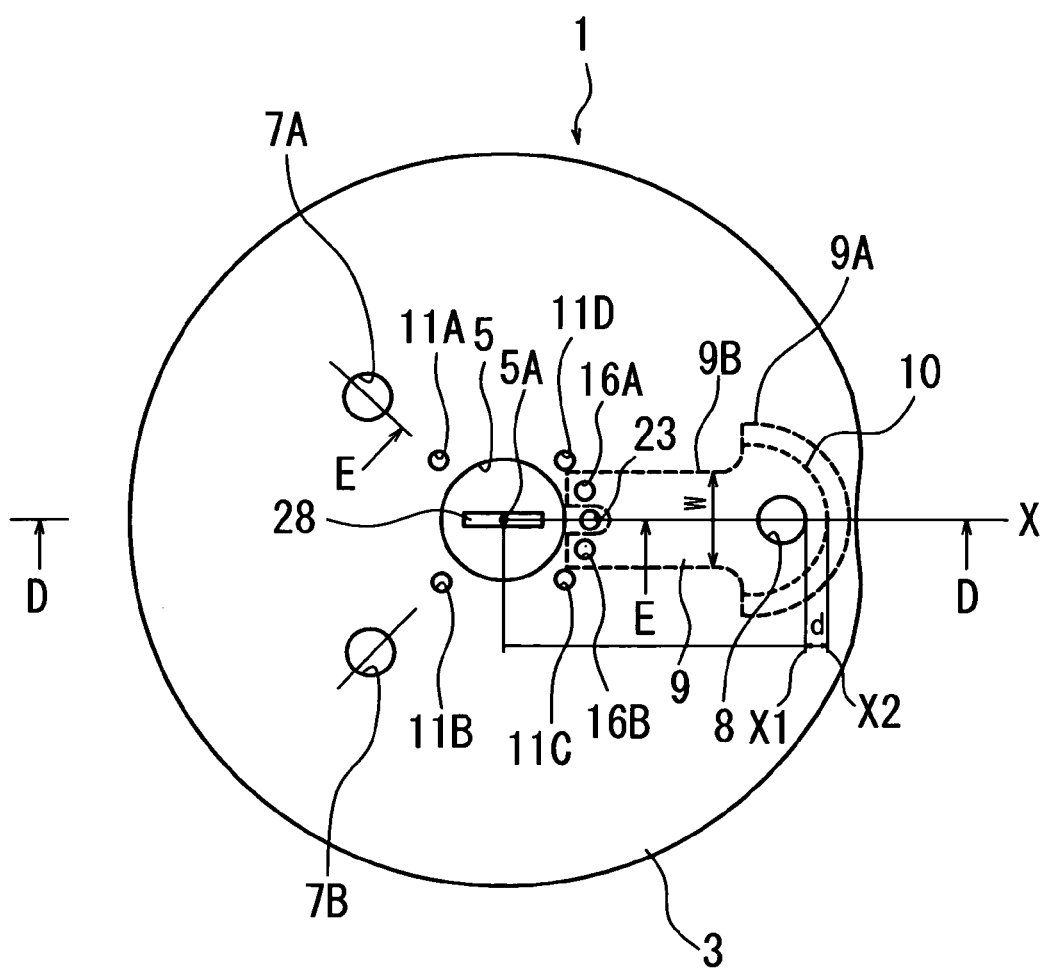
FIG. 7 is a plan view of an airbag device according to a second embodiment of the invention.
Figure 8:
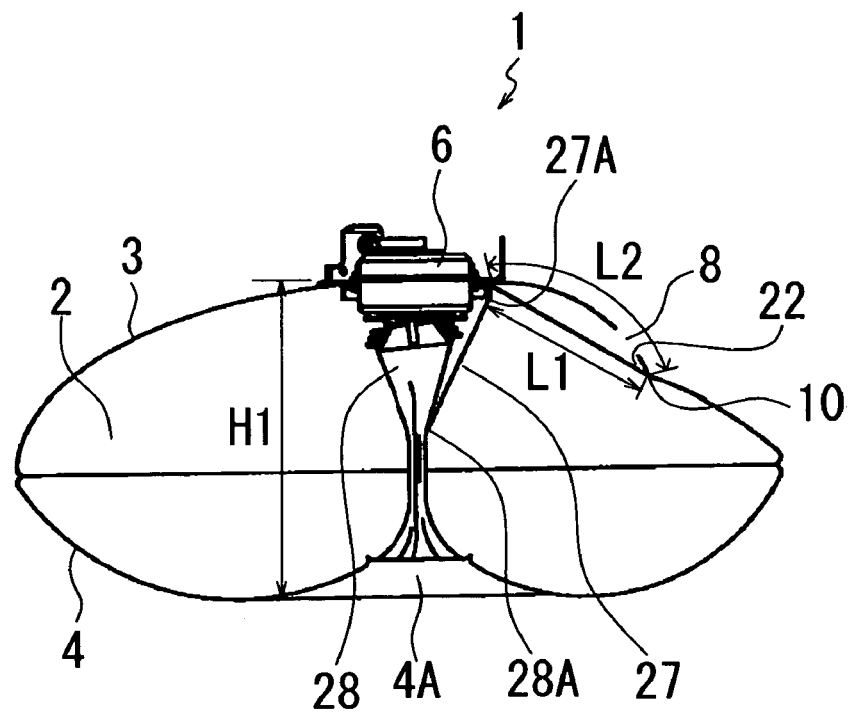
FIG. 8 is a sectional view taken along line D-D in FIG. 7 showing a state where a vent hole is opened.

An airbag device according to the second embodiment of the invention is next described hereinafter with reference to the accompanying drawings. The second embodiment is structured such that the closing of a vent hole 8 and the switching of the developing height of an airbag are carried out by a common retaining device. Parts which are the same as those in the first embodiment are denoted by and described with the same reference numerals. FIG. 7 is a plan view showing a state where an airbag device 1 is expanded, and an inflator 6 is removed. FIG. 8 is a sectional view taken along line D-D in FIG. 7 showing a state where the inflator 6 is fitted. As shown in FIG. 7-FIG. 8, the airbag device 1 is formed of the airbag 2 comprised of an attachment side base cloth 3 having a circular shape and an opposed side base cloth 4 having also the circular shape and peripheries of the attachment side base cloth 3 and opposed side base cloth 4 are sewn together and reversed to form the airbag 2 having a bag-like shape. The attachment side base cloth 3 is located at a side to be fitted to a vehicle together with the inflator 6 while the opposed side base cloth 4 is located at a side to face the occupant and receives the occupant when the airbag 2 is expanded. The inflator 6 is fitted to a circular gas inflow port 5 formed on the center of the attachment side base cloth 3, and gas generated in the inflator 6 flows in the airbag 2 through the gas inflow port 5, to expand the airbag 2 while developing the airbag 2 in a folded state. There are defined four bolt insertion holes 11A, 11B, 11C and 11D in the attachment side base cloth 3 each spaced at 90 degrees at the peripheral portion of the inflow port 5 of the attachment side base cloth 3, and the airbag 2 is fitted to the vehicle using these bolt insertion holes 11A-11D.

Figure 10:
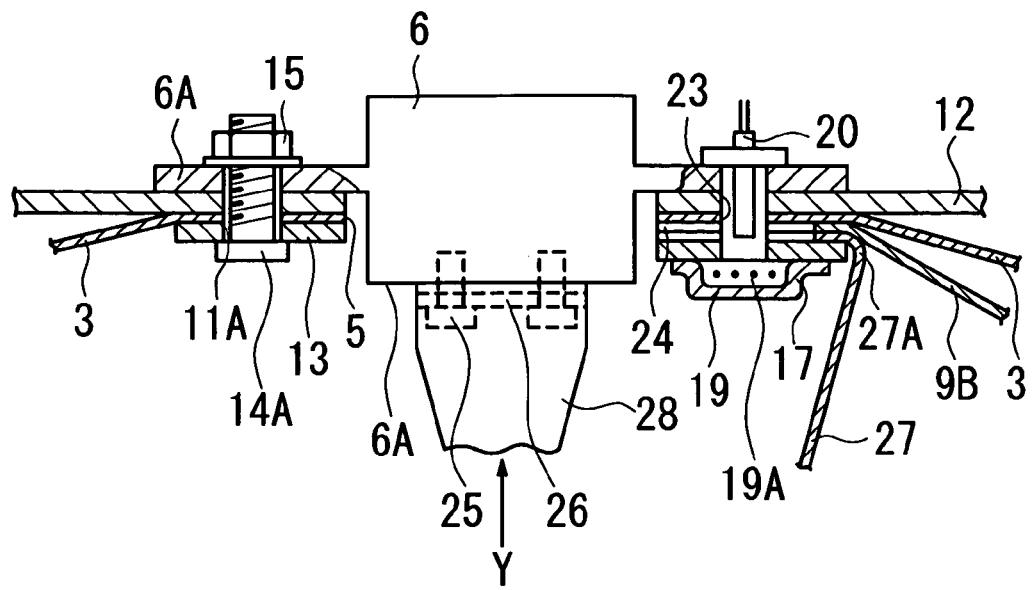
FIG. 10 is an enlarged sectional view taken along line E-E in FIG. 7.
Figure 11:
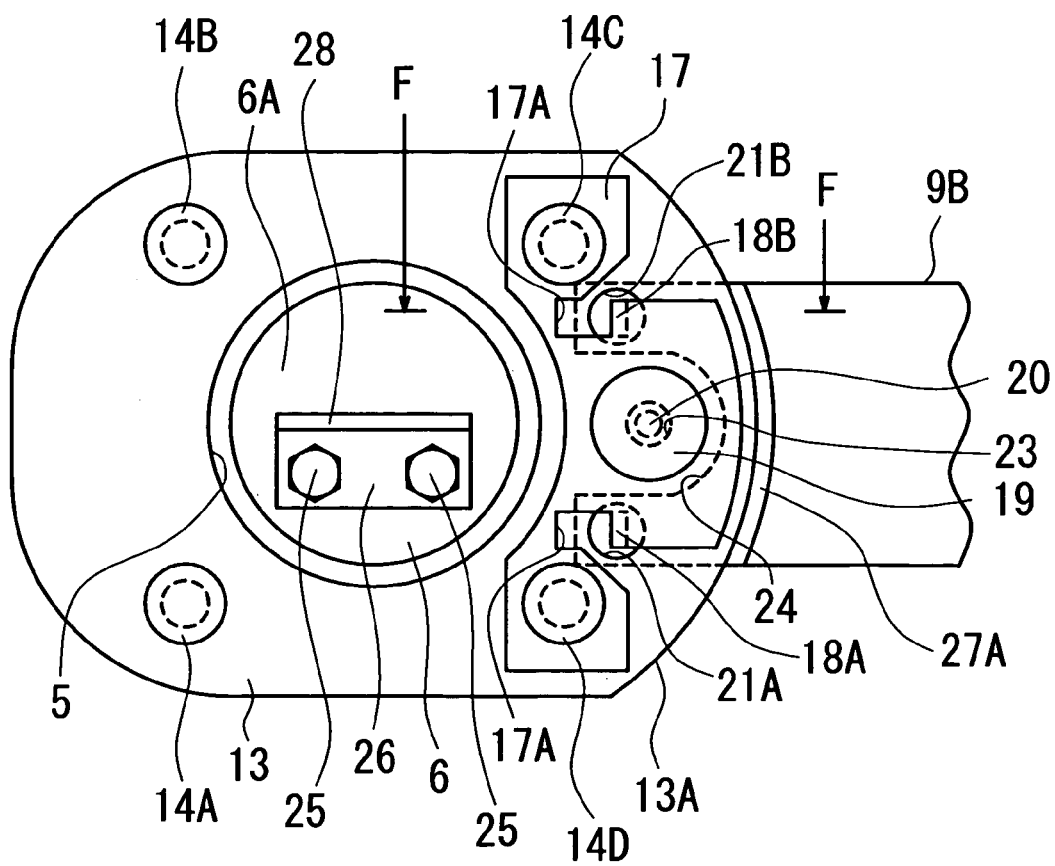
FIG. 11 is a view as viewed from an arrow Y in FIG. 10.
Figure 12:
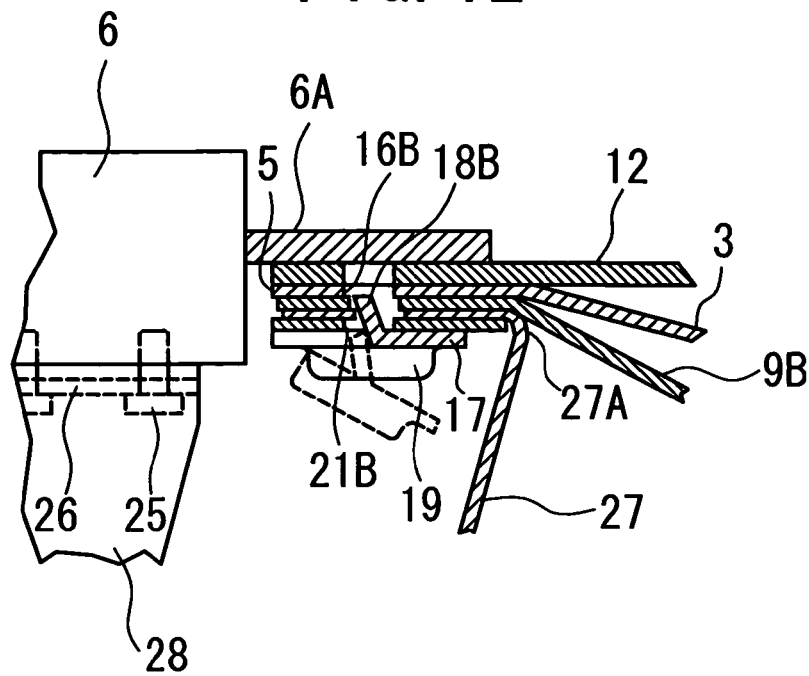
FIG. 12 is a sectional view taken along line F-F in FIG. 11.

FIG. 10-FIG. 11 show a detailed structure of a metal fitting portion by means of which the airbag 2 is fitted to the vehicle, wherein FIG. 10 is an enlarged sectional view taken along line E-E in FIG. 7, FIG. 11 is a view as viewed from an arrow Y in FIG. 10, and FIG. 12 is a sectional view taken along line F-F in FIG. 11. As shown in FIG. 10 to FIG. 12, the attachment side base cloth 3 is clamped between a substantially disc-like presser plate 13 and a metal fitting 12, and it is fixed to the metal fitting 12 together with a flange 6A of the inflator 6 by means of four bolts 14A-14D inserted into the bolt insertion holes 11A-11D and nuts 15 screwed into the bolts 14A-14D respectively. In the manner described above, the folded airbag 2 and the metal fitting 12 to which the inflator 6 is fitted are fixed to a central portion of a steering wheel of the vehicle (not shown).

Figure 9:
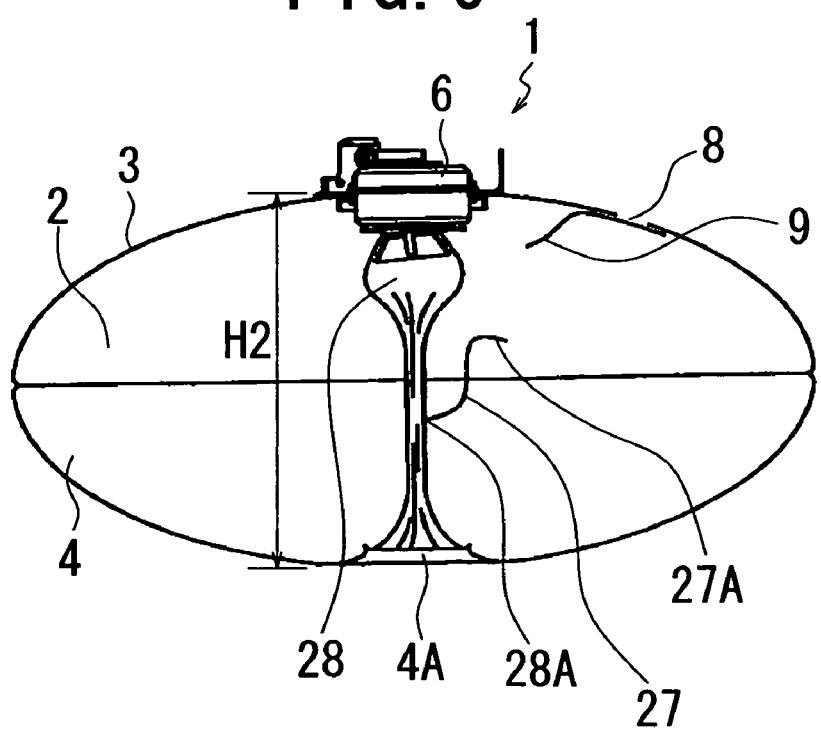
FIG. 9 is a sectional view taken along line D-D in FIG. 7 showing a state where the vent hole is closed.

As shown in FIG. 8, FIG. 10 and FIG. 11, a first tether belt 28 is stretched between an inside end face 6A of the inflator 6 and a central portion 4A of the opposed side base cloth 4. That is, an upper end of the first tether belt 28 is put in the inside end face 6A of the inflator 6 by a presser plate 26, and the presser plate 26 is fixed to the inside end face 6A by two bolts 25, 25, thereby fixing the first tether belt 28 to the inside end face 6A. The lower end of the first tether belt 28 is sewn and fixed to the central portion 4A of the opposed side base cloth 4. Further, a lower end of a second tether belt 27 is sewn and fixed to the opposed side base cloth 4 at a substantially intermediate position 28A of the first tether belt 28 in the longitudinal direction thereof. Further, an upper end 27A of the second tether belt 27 is detachably fitted to the presser plate 13 together with the cloth-like piece 9, described later. In a state where the upper end 27A of the second tether belt 27 is fitted to the presser plate 13, the opposed side base cloth 4 is restricted in its developing height to H1 by the second tether belt 27, and at this point in time, the first tether belt 28 is rendered in a slackened state at the side over the intermediate position 28A. That is, as shown in FIG. 9, when the upper end 27A of the second tether belt 27 comes off the presser plate 13, the slackness of the first tether belt 28 at the side over the intermediate position 28A is removed owing to a gas pressure operating on the opposed side base cloth 4, so that the airbag 2 is expanded up to the developing height H2 which is determined by the full length of the first tether belt 28. According to the second embodiment, although the first tether belt 28 go slacks at the side over the intermediate position 28A when the developing height is restricted to H1 by the second tether belt 27, the first tether belt 28 may not go slacks at the side over the intermediate position 28A. That is, in a state where the opposed side base cloth 4 is restricted in developing height to H1 by the second tether belt 27, the first tether belt 28 is bent in an L-shape at the intermediate position 28A and stretches linearly from the intermediate position 28A to the upper end of the first tether belt 28. When the upper end 27A of the second tether belt 27 comes off the presser plate 13, the first tether belt 28 stretches linearly from the upper end to the lower end thereof, rendering the developing height to H2.

In the second embodiment shown in FIG. 8 and FIG. 9, although the lower end of the second tether belt 27 is sewn to the first tether belt 28 at substantially the intermediate position 28A of the first tether belt 28 in the longitudinal direction, it may be sewn to the opposed side base cloth 4 (at the position in the vicinity of the central portion 4A to which the lower end of the first tether belt 28 is sewn). In this case, it is sufficient to set the length of the second tether belt 27 from the upper end to the lower end to be smaller than the length of the first tether belt 28 from the upper end to the lower end thereof. In the manner described above, in a state where the upper end 27A of the second tether belt 27 is fitted to the presser plate 13, the opposed side base cloth 4 is restricted to be low in the developing height by the length of the second tether belt 27 from the upper end to the lower end, and at this point in time, the first tether belt 28 is caused to go slack at the entire length. Then, when the upper end 27A of the second tether belt 27 comes off the presser plate 13, the first tether belt 28 has no slackness due to gas pressure applied to the opposed side base cloth 4, so that the airbag 2 is expanded up to the developing height which is determined by the entire length of the first tether belt 28.

As shown in FIG. 7, three vent holes 7A, 7B and 8 are defined in the attachment side base cloth 3 for discharging gas flowing in the airbag 2 outward. Two vent holes 7A, 7B are formed at positions which are equally spaced from a center 5A of the gas inflow port 5 in a radial direction, while the gas vent hole 8 is formed at a position spaced outwardly from the center 5A of the gas inflow port 5 in a radial direction while opposing the vent holes 7A, 7B, wherein a distance from the vent hole 8 to the center 5A is longer than that from the vent holes 7A, 7B to the center 5A. As shown by dotted lines in FIG. 7, a cloth-like piece 9 for closing the vent hole 8 is fitted to the inside of the attachment side base cloth 3. The cloth-like piece 9 has a length extending outwardly from the peripheral portion of the gas inflow port 5 and exceeding the outer end of the vent hole 8, and it is comprised of a parallel portion 9B extending outwardly in the radial direction from the peripheral portion of the gas inflow port 5 and a semicircular portion 9A having a curvature radius which is larger than that of the vent hole 8, and made of a cloth which is the same material as the airbag 2. The cloth-like piece 9 may be made of a cloth which is different from the material of the airbag 2. Further, the cloth-like piece 9 is not limited to a cloth and may be formed of a sheet-like material such as plastics and the like if the material has a flexibility capable of closing the vent hole 8. The cloth-like piece 9 is sewn and fixed to the attachment side base cloth 3 at a coordinate axis position X2 which is spaced by a distance d in an outward radial direction from a coordinate axis position X1 extending in the direction of X from the center 5A of the gas inflow port 5 to the edge of the vent hole 8 in the radial direction. A sewn portion 10 of the cloth-like piece 9 has a circular-arc shape and spaced from the edge of the vent hole 8. A width W of the parallel portion 9B of the cloth-like piece 9 is set to be larger than a diameter of the vent hole 8 and has a width which is sufficient to completely close the vent hole 8. When the width W of the parallel portion 9B of the cloth-like piece 9 is made smaller than the diameter of the vent hole 8, the vent hole 8 is not completely closed but it is possible to control the vent hole 8 so as to discharge gas slightly.

The parallel portion 9B and the upper end 27A of the second tether belt 27 are detachably fitted to a presser plate 13 at the peripheral portion side of the gas inflow port 5. That is, as shown in FIG. 7, there are defined two retaining holes 16A, 16B in the parallel portion 9B, the upper end 27A of the second tether belt 27, and the attachment side base cloth 3 between the bolt insertion holes 11D, 11C along the same circumference of the bolt insertion holes 11D, 11C. An ignitor insertion hole 23 through which an ignitor 20 is inserted, is defined in the attachment side base cloth 3 between two retaining holes 16A, 16B while U-shaped notches 24 are formed on the parallel portion 9B and the upper end 27A of the second tether belt 27, respectively, so as to surround the ignitor insertion hole 23. As shown in FIG. 10 and FIG. 11, the parallel portion 9B and the upper end 27A of the second tether belt 27 are inserted in a gap defined between the presser plate 13 and the attachment side base cloth 3 while the two retaining holes 16A, 16B are positioned so as to align with two holes 21A, 21B defined in the presser plate 13. Then, the retaining plate 17 is fixed to the presser plate 13 by way of bolts 14C, 14D, while retaining projections 18A, 18B of the retaining plate 17 are inserted into the retaining holes 16A, 16B of the parallel portion 9B and the upper end 27A of the second tether belt 27 through two holes 21A, 21B, thereby restraining the parallel portion 9B and the upper end 27A of the second tether belt 27 from not being come off the presser plate 13.

An explosive chamber 19 protruding cylindrically toward the inside of the airbag 2 is formed on the retaining plate 17 at the intermediate portion between the retaining projections 18A, 18B, while the explosive 19A is sealed in the explosive chamber 19. The ignitor 20 for igniting the explosive 19A is fitted to the flange 6A of the inflator 6, and the tip end of the ignitor 20 extends to a portion in the vicinity of the explosive 19A. Since necking portions 17A, 17A are provided on the retaining plate 17, when the explosive 19A in the explosive chamber 19 is exploded, the retaining plate 17 is bent along the necking portions 17A, 17A due to gas pressure caused by explosion, as shown by two dotted chain lines in FIG. 12, to be subjected to plastic deformation, the retaining projections 18A, 18B come off the retaining holes 16A, 16B of the parallel portion 9B and the upper end 27A of the second tether belt 27, enabling the parallel portion 9B and the upper end 27A of the second tether belt 27 to come off the presser plate 13. Accordingly, when the explosive 19A is exploded in a state where the airbag 2 is expanded, the cloth-like piece 9 is pulled out toward the outer peripheral side of the airbag 2 due to a tensile force operating on the attachment side base cloth 3, and the parallel portion 9B comes off the presser plate 13. At the same time, the upper end 27A of the second tether belt 27 is pulled out toward the opposed side base cloth 4 side owing to a tensile force operating on the first tether belt 28, to thereby come off the presser plate 13. Igniting timing of the ignitor 20 is determined by detecting as to whether the occupant sits down on the seat in the vicinity of the airbag device or not. There are concrete examples, as a detection method, such as a method of detecting the occupant by means of a CCD camera, and an infrared sensor, a method of detecting a magnitude or a distribution of a load of the occupant applied to the seat by a load sensor, and the like.

As shown in FIG. 8, as for a length from the sewn portion 10 to the right periphery 13A of the presser plate 13 is set such that L1 is shorter than L2 where L2 indicates a length at the attachment side base cloth 3 side while L1 indicates a length at the cloth-like piece 9 side. Accordingly, when the airbag 2 is expanded due to a pressure of gas introduced in the airbag 2, the cloth-like piece 9 having the short length is stretched linearly while the attachment side base cloth 3 side having the long length is expanded substantially in circular-arc to move away from the cloth-like piece 9 outward, so that the vent hole 8 keeps open. Particularly an arc-like pocket 22 defined between the sewn portion 10 and the vent hole 8 functions as a gas reservoir for interrupting a flow of gas directing from the gas inflow port 5 toward the opposed side base cloth 4 to function to guide the interrupted gas into the vent hole 8, thereby discharging the gas efficiently outward from the vent hole 8 so that the airbag 2 is slowly expanded while a speed of the airbag 2 gas directing toward the occupant is reduced. If the length L2 at the attachment side base cloth 3 side, the length L1 at the cloth-like piece 9 side, a distance d from the outer end of the vent hole 8 to the sewn portion 10, and a width W of the parallel portion 9B are changed appropriately, respectively, discharge amount of the gas from the vent hole 8 is changed so that an expanding speed of the airbag 2 can be suitably adjusted depending on the size of the airbag 2 and the like.

An airbag device according to the third embodiment of the invention is next described hereinafter with reference to the accompanying drawings. The third embodiment is structured such that the shape of the cloth-like piece of the first embodiment is changed to a simple shape and parts which are the same as those in the first embodiment are denoted by and described with the same reference numerals.

Figure 13:
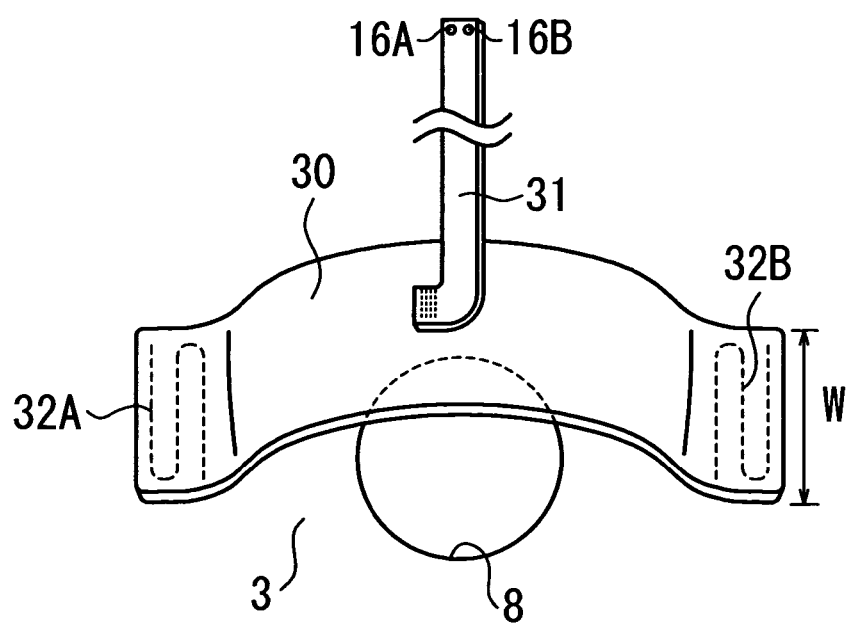
FIG. 13 is a perspective view of a cloth-like piece of an airbag device according to a third embodiment of the invention.

FIG. 13 is a perspective view of a cloth-like piece of an airbag device according to the third embodiment of the invention. As shown in FIG. 13, a rectangular cloth-like piece 30 which is long in right and left direction for closing a vent hole 8 is fitted to an inside of an attachment side base cloth 3. The cloth-like piece 30 is sewn to and fixed to the attachment side base cloth 3 at sewing portion 32A, 32B at both ends spaced from an edge of the vent hole 8. A width W of the cloth-like piece 30 is set to be larger than a diameter of the vent hole 8 and is sufficient to completely close the vent hole 8. A lower end of an extension cloth 31 is fixed to the cloth-like piece 30 at substantially central portion thereof in the right and left longitudinal direction, and two retaining holes 16A, 16B are defined in the extension cloth 31 at the upper end. A material of the extension cloth 31 may be the same as the airbag 2 or may be different from the airbag 2. Further, the extension cloth 31 is not limited to be made of a cloth but may be made of a material such as plastics and the like if it has flexibility. The extension cloth 31 may be integrally formed with the cloth-like piece 30. The retaining holes 16A, 16B of the extension cloth 31 at the upper end are retained by a retaining device 17 as explained in the first embodiment, and the retention is released at given timing, so that the cloth-like piece 30 is pressed toward the attachment side base cloth 3 by a gas pressure to close the vent hole 8. That is, when retaining projections 18A, 18B of the retaining plate 17 (not shown), as explained in the first embodiment, is inserted into the retaining holes 16A, 16B defined in the upper end of the extension cloth 31, the extension cloth 31 is restrained not to be come off the presser plate 13.

Figure 14:
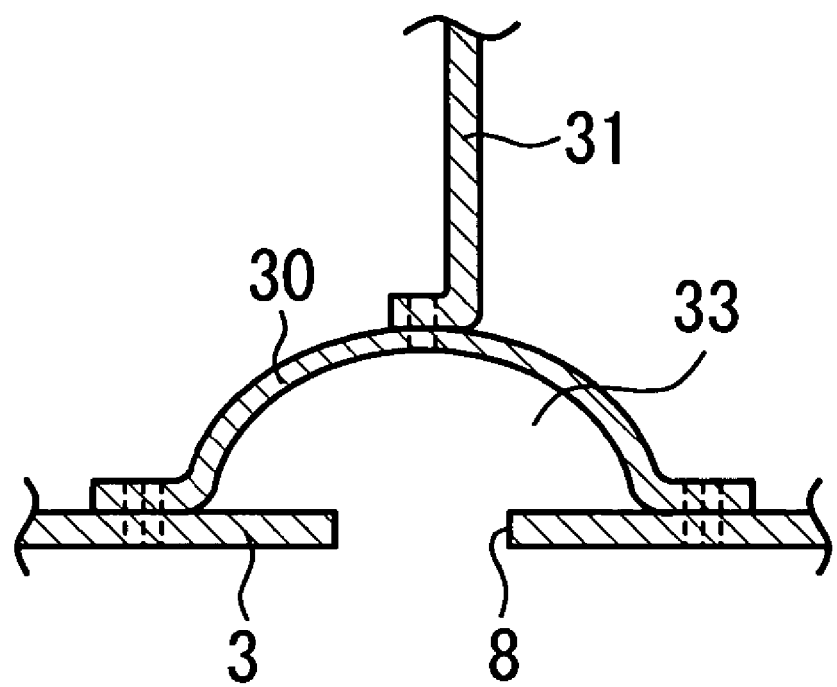
FIG. 14 is a sectional view of FIG. 13 showing a state where a vent hole is opened.
Figure 15:
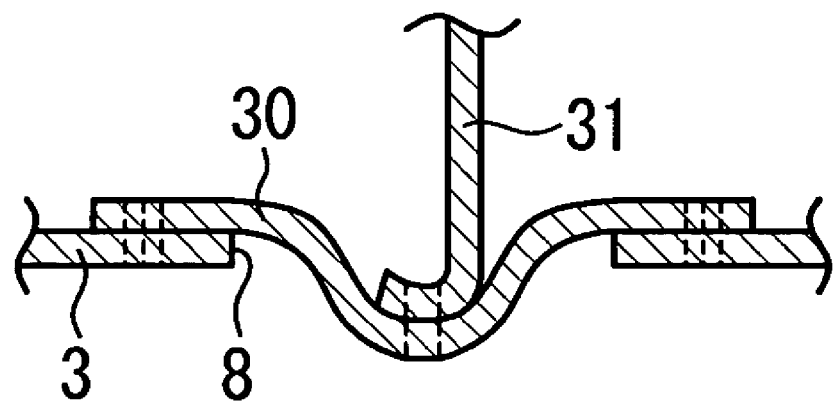
FIG. 15 is a sectional view of FIG. 13 showing a state where the vent hole is closed.

When the airbag 2 is expanded owing to gas let out from an inflator 6 at the time of collision of the vehicle, the extension cloth 31 is stretched linearly by a tensile force of the airbag 2, so that the cloth-like piece 30 is pulled toward the inside of the airbag 2. As a result, the cloth-like piece 30 is moved away from the attachment side base cloth 3, and expanded in a substantially circular arc to form a gap 33 having a substantially circular arc between the cloth-like piece 30 and the attachment side base cloth 3, thereby keeping a state where the vent hole 8 is opened (FIG. 14). Accordingly, gas flown in the airbag 2 is discharged efficiently outward from the vent hole 8, so that the airbag 2 is expanded while an impactive expansion directing toward the occupant is eased. When the airbag 2 becomes a sufficient size to protect the occupant, the explosive 19A is ignited to generate a gas pressure, which causes the retaining plate 17 to be instantaneously bent at the necking portions 17A. The retaining projections 18A, 18B come off the retaining holes 16A, 16B of the extension cloth 31. Since a tensile force based on the expansion force of the attachment side base cloth 3 caused by the gas pressure is added to the extension cloth 31, the extension cloth 31 comes off the presser plate 13, so that the cloth-like piece 30 is brought into intimate contact with the attachment side base cloth 3 owing to the gas pressure as shown in FIG. 15, thereby closing the vent hole 8 to stop the discharge of gas from the vent hole 8. At this stage, the opposed side base cloth 4 of the airbag 2 contacts the occupant, so that the opposed side base cloth 4 somewhat expands owing to inflowing gas to receive the occupant softly.

What is claimed is:

1. An airbag device having an inflator for generating gas and an airbag expandable by the gas, said airbag device comprising:

a gas inflow port provided in the airbag through which the gas flows in, a vent hole provided in the airbag for discharging the gas flown in the airbag, a cloth-like piece connected to a vicinity of the vent hole at one end thereof, and to a vicinity of the gas inflow port at the other end thereof releasably, wherein said cloth-like piece does not close the vent hole in a state where the other end is retained, and closes the vent hole due to an internal pressure of the airbag in a state where the other end is released, a retaining device for retaining the other end of the cloth-like piece, and releasing means for releasing retention of the retaining device, wherein the retaining device has a retaining plate, and the releasing means implements releasing by forcibly deforming the retaining plate.

2. The airbag device according to claim 1, wherein the releasing means implements releasing by forcibly deforming the retaining plate by a pressure generated by an explosive.

* * * * *